(12) United States Patent
Huang et al.

(10) Patent No.: US 9,146,691 B2
(45) Date of Patent: Sep. 29, 2015

(54) METHOD FOR MANAGING COMMANDS IN COMMAND QUEUE, MEMORY CONTROL CIRCUIT UNIT AND MEMORY STORAGE APPARATUS

(71) Applicant: PHISON ELECTRONICS CORP., Miaoli (TW)

(72) Inventors: Yi-Hsiang Huang, Hsinchu (TW); Chao-Ming Chan, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 256 days.

(21) Appl. No.: 14/017,284

(22) Filed: Sep. 3, 2013

(65) Prior Publication Data

US 2015/0012687 A1  Jan. 8, 2015

(30) Foreign Application Priority Data

Jul. 2, 2013 (TW) .............................. 102123698 A

(51) Int. Cl.
*G06F 12/00* (2006.01)
*G06F 3/06* (2006.01)

(52) U.S. Cl.
CPC ............ *G06F 3/0659* (2013.01); *G06F 3/0604* (2013.01); *G06F 3/0679* (2013.01)

(58) Field of Classification Search
CPC .... G06F 3/0659; G06F 3/0679; G06F 3/0604
USPC .......................................... 711/103, 154, 170
See application file for complete search history.

(56) References Cited

U.S. PATENT DOCUMENTS

| | | | |
|---|---|---|---|
| 7,206,919 B2 * | 4/2007 | Goel et al. ..................... | 711/220 |
| 7,376,810 B2 * | 5/2008 | Polizzi et al. ................. | 711/211 |
| 8,572,344 B2 * | 10/2013 | Russo et al. .................. | 711/166 |
| 8,817,558 B2 * | 8/2014 | Fujisawa ....................... | 365/194 |
| 2012/0089788 A1 * | 4/2012 | Hemmi et al. ................ | 711/149 |

* cited by examiner

*Primary Examiner* — Matthew Bradley
(74) *Attorney, Agent, or Firm* — Jianq Chyun IP Office

(57) ABSTRACT

A method for managing commands in a command queue, a memory controller, and a memory storage apparatus are provided. The method includes: storing at least one first command in a command queue register according to a plurality of first indication bits and updating the first indication bits according to a current storage status of the command queue register; generating a plurality of updated second indication bits according to the updated first indication bits and a plurality of second indication bits. The method also includes: obtaining at least one first command index corresponding to at least one register block storing the at least one first command in the command queue register according to the updated second indication bits and adding the at least one first command index into a command index register; executing commands corresponding to un-executed command indices in the command queue register.

24 Claims, 11 Drawing Sheets

METHOD FOR MANAGING COMMANDS IN COMMAND QUEUE, MEMORY CONTROL CIRCUIT UNIT AND MEMORY STORAGE APPARATUS

CROSS-REFERENCE TO RELATED APPLICATION

This application claims the priority benefit of Taiwan application serial no. 102123698, filed on Jul. 2, 2013. The entirety of the above-mentioned patent application is hereby incorporated by reference herein and made a part of this specification.

BACKGROUND

1. Technology Field

The present invention relates to a method for managing commands in a command queue, a memory control circuit unit using the method, and a memory storage apparatus using the method.

2. Description of Related Art

Conventionally, data and/or commands are often transmitted between a universal serial bus (USB) mass storage device and a computer host according to a bulk only transport (BOT) protocol. Under the BOT protocol, the USB mass storage device can transmit one command to or receive one command from the computer host at a time, and the next command may be transmitted or received only after the previous command is completely executed.

The BOT protocol, however, is practically rigid, and the requirements for data processing efficiency and file transmission performance of the USB mass storage device have been increasing. In response thereto, a USB attached small computer system interface (SCSI) protocol has been proposed to address the issues (e.g., low data transmission efficiency) of the conventional BOT protocol.

Notwithstanding the introduction of the USB attached SCSI protocol, there lacks any effective mechanism of integrating the advantages of the USB attached SCSI protocol into the systems and structures of the existing storage media.

Nothing herein should be construed as an admission of knowledge in the prior art of any portion of the invention. Furthermore, citation or identification of any document in this application is not an admission that such document is available as prior art to the invention, or that any reference forms a part of the common general knowledge in the art.

SUMMARY

Accordingly, the present invention is directed to a method for managing commands in a command queue, a memory control circuit unit using the method, and a memory storage apparatus using the method, so as to effectively manage commands received from a host system.

In an exemplary embodiment of the present invention, a method for managing a plurality of commands received from a host system in a command queue is provided. The method includes: configuring a command queue register, a first indicator, and a second indicator, wherein the command queue register includes a plurality of command transient units, and each of the command transient units has a command index; configuring a command index register that has an start index, an end index, and an outstanding command index. The method also includes: receiving at least one first command from the host system; storing the at least one first command in the command queue register according to a plurality of first indication bits in the first indicator and updating the first indication bits according to a current storage status of the command queue register to generate a plurality of updated first indication bits; and generating a plurality of updated second indication bits according to the updated first indication bits in the first indicator and a plurality of second indication bits in the second indicator. The method further includes: obtaining the number of the at least one first command and at least one first command index among the command indices according to the updated second indication bits, wherein the at least one first command index corresponds to a command transient unit storing the at least one first command among the command transient units in the command queue register; adding the at least one first command index into the command index register and updating the end index according to the number of the at least one first command; executing a plurality of commands stored in the corresponding command transient units of the command queue register, wherein the commands correspond to a plurality of un-executed command indices recorded in the command index register.

In another exemplary embodiment of the present invention, a memory control circuit unit that includes a host interface and a memory management circuit is provided. The host interface is configured to couple to a host system. The host interface is coupled to the memory management circuit. The memory management circuit is configured to configure a command queue register, a first indicator, and a second indicator, and the command queue register includes a plurality of command transient units, and each of the command transient units has a command index. The memory management circuit is further configured to configure a command index register, and the command index register comprises a start index, an end index, and an outstanding command index. The memory management circuit is further configured to receive at least one first command from the host system, store the at least one first command in the command queue register according to a plurality of first indication bits in the first indicator, and update the first indication bits according to a current storage status of the command queue register to generate a plurality of updated first indication bits. The memory management circuit is further configured to generate a plurality of updated second indication bits according to the updated first indication bits in the first indicator and a plurality of second indication bits in the second indicator and obtain a amount of the at least one first command and at least one first command index of the command indices according to the updated second indication bits, and the at least one first command index corresponds to a command transient unit storing the at least one first command among the command transient units in the command queue register. The memory management circuit is further configured to add the at least one first command index into the command index register and update the end index according to the number of the at least one first command. The memory management circuit is further configured to execute the commands stored in the corresponding command transient units of the command queue register, wherein the commands correspond to a plurality of un-executed command indices recorded in the command index register.

In another exemplary embodiment of the present invention, a memory storage apparatus that includes a connect interface unit and a memory control circuit unit is provided. The connect interface unit is configured to couple to a host system. The memory control circuit unit is coupled to the connect interface unit. The memory control circuit unit is configured to configure a command queue register, a first indicator, and a second indicator, and the command queue register includes a plurality of command transient units, and each of the command transient units has a command index. The memory control circuit unit is further configured to configure a command index register, and the command index register comprises an start index, an end index, and an outstanding command index. The memory control circuit unit is further configured to receive at least one first command from the host system, store the at least one first command in the command queue register according to a plurality of first indication bits in the first indicator, and update the first indication bits according to a current storage status of the command queue register to generate a plurality of updated first indication bits. The memory control circuit unit is further configured to generate a plurality of updated second indication bits according to the updated first indication bits in the first indicator and a plurality of second indication bits in the second indicator and obtain the number of the at least one first command and at least one first command index of the command indices according to the updated second indication bits, and the at least one first command index corresponds to a command transient unit storing the at least one first command among the command transient units in the command queue register. The memory control circuit unit is further configured to add the at least one first command index into the command index register and update the end index according to the number of the at least one first command. The memory control circuit unit is further configured to execute a plurality of commands stored in the corresponding command transient units of the command queue register, wherein the commands correspond to a plurality of un-executed command indices recorded in the command index register.

In view of the above, according to said method for managing commands in a command queue, said memory control circuit unit using the method, and said memory storage apparatus using the method, the commands received from the host system can be managed in an optimal manner.

It should be understood, however, that this Summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
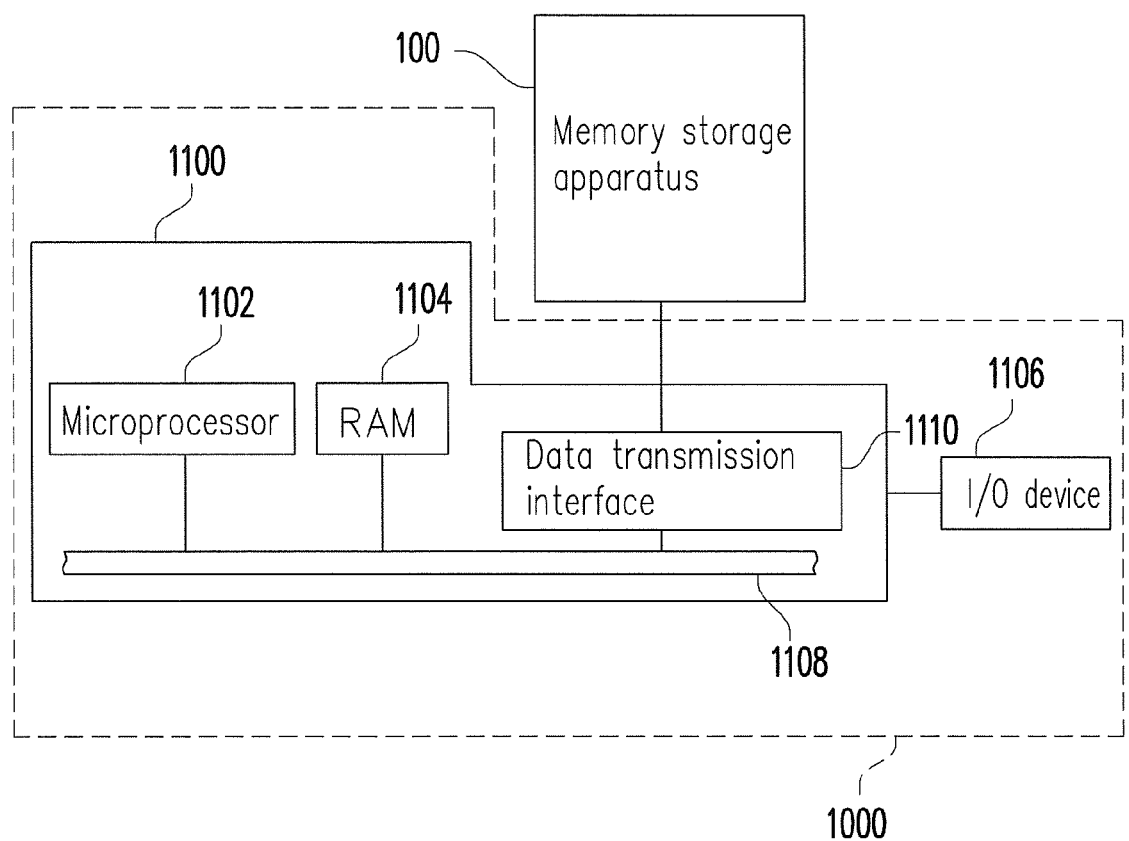
FIG. 1A illustrates a host system and a memory storage apparatus according to an exemplary embodiment of the present invention.

Reference will now be made in detail to the present embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage apparatus (also referred to as a memory storage system) typically includes a rewritable non-volatile memory module and a controller (also referred to as a control circuit). The memory storage apparatus is usually used together with a host system, such that the host system is able to write data into or read data from the memory storage apparatus.

FIG. 1A illustrates a host system and a memory storage apparatus according to an exemplary embodiment of the present invention.

Figure 1B:
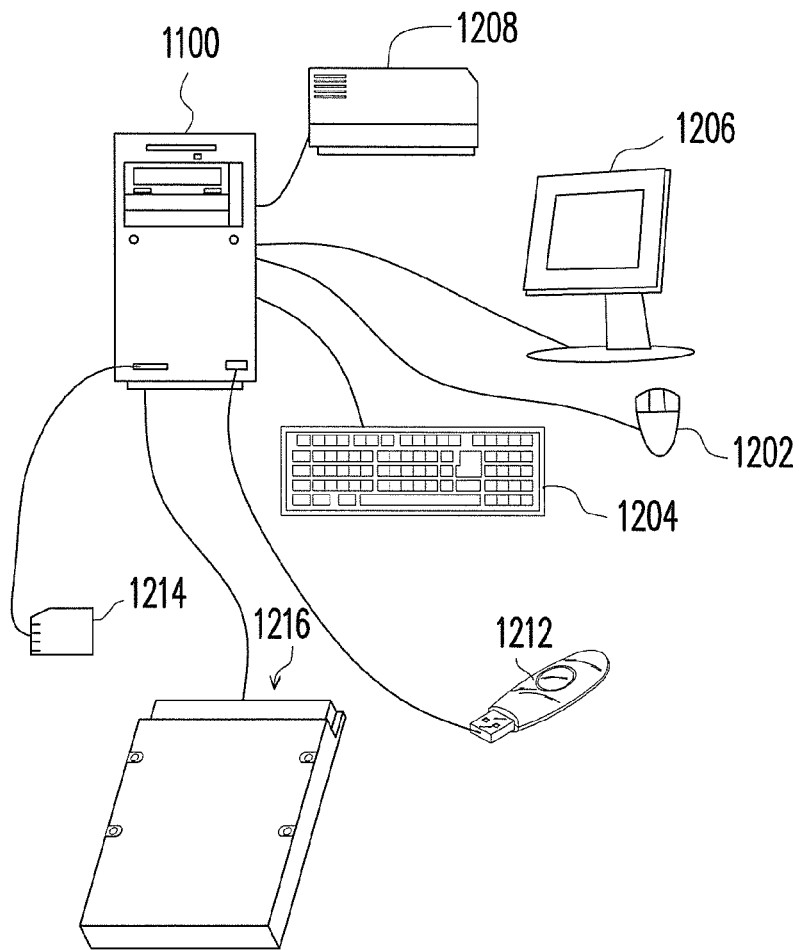
FIG. 1B schematically illustrates a computer, an input/output (I/O) device, and a memory storage apparatus according to an exemplary embodiment of the present invention.

With reference to FIG. 1A, a host system 1000 in most cases includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the I/O device 1106 is not limited to that illustrated in FIG. 1B and may further include other devices.

In the exemplary embodiment of the invention, the memory storage apparatus 100 is coupled to other devices of the host system 1000 through the data transmission interface 1110. Through operating the microprocessor 1102, the RAM 1104, and the I/O device 1106, the data can be written into or read from the memory storage apparatus 100. For instance, the memory storage apparatus 100 may be a rewritable non-volatile memory storage apparatus, such as a portable drive 1212, a memory card 1214, or a solid state drive (SSD) 1216 as illustrated in FIG. 1B.

Figure 1C:
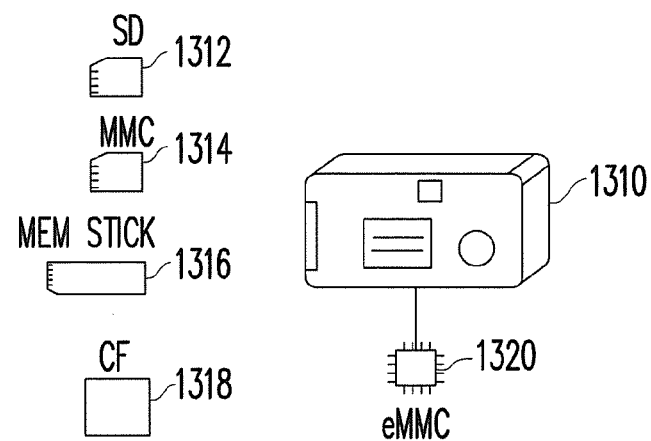
FIG. 1C schematically illustrates a host system and a memory storage apparatus according to an exemplary embodiment of the present invention.

Generally, the host system 1000 may be any system that can be substantively operated together with the memory storage apparatus 100 to store data. In the exemplary embodiment, although the host system 1000 is described as a computer system, the host system 1000 in another exemplary embodiment of the present invention may be a digital camera, a video camera, a communication device, an audio player, a video player, and so forth. For instance, if the host system is a digital camera (video camera) 1310, the rewritable non-volatile memory storage apparatus is a secure digital (SD) card 1312, a multi media card (MMC) 1314, a memory stick (MS) 1316, a compact flash (CF) card 1318, or an embedded storage apparatus 1320 (as shown in FIG. 1C) used by the digital camera (video camera) 1310. The embedded storage apparatus 1320 includes an embedded MMC (eMMC). It should be mentioned that the eMMC is directly coupled to the motherboard of the host system.

Figure 2:
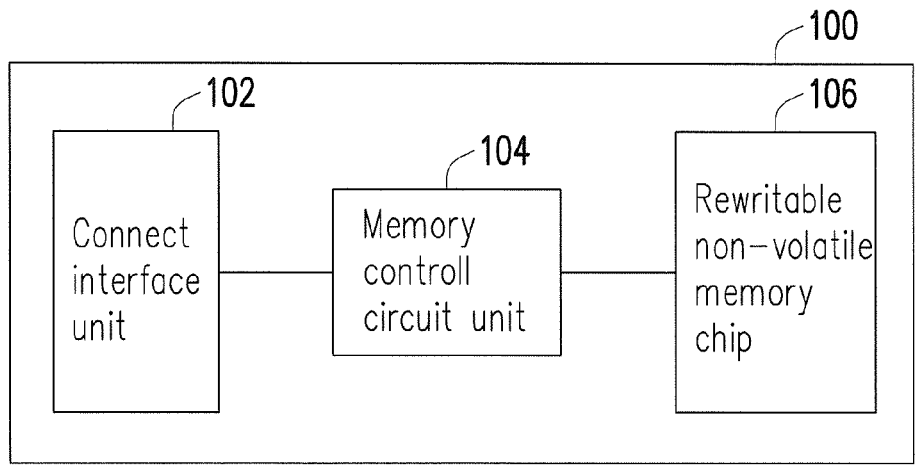
FIG. 2 is a simple block diagram illustrating the memory storage apparatus depicted in FIG. 1A.

FIG. 2 is a simple block diagram illustrating the memory storage apparatus depicted in FIG. 1A.

With reference to FIG. 2, the memory storage apparatus 100 includes a connect interface unit 102, a memory control circuit unit 104, and a rewritable non-volatile memory chip 106.

In the present exemplary embodiment, the connect interface unit 102 complies with the serial advanced technology attachment (SATA) standard. However, it should be understood that the invention is not limited thereto, and the connect interface unit 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) standard, the ultra high speed-I (UHS-I) interface standard, the ultra high speed-II (UHS-II) interface standard, the memory sick (MS) interface standard, the multi media card (MMC) interface standard, the eMMC interface standard, the universal flash storage (UFS) interface standard, the compact flash (CF) standard, the integrated device electronics (IDE) standard, or other suitable standards. In the present exemplary embodiment, the connect interface unit 102 may be embedded in a chip with a memory control circuit unit 104, or configured outside of a chip comprising the memory control circuit unit 104.

The memory control circuit unit 104 executes a plurality of logic gates or control instructions implemented in a hardware form or a firmware form and performs various data operations according to commands from the host system 1000, such as data writing, reading, and erasing in the rewritable non-volatile memory chip 106.

The rewritable non-volatile memory chip 106 is coupled to the memory control circuit unit 104 and configured to store data written by the host system 1000. The rewritable non-volatile memory chip 106 has a plurality of physical erasing units. Each physical erasing unit has a plurality of physical programming units, and the physical programming units of the same physical erasing unit may be written independently and erased simultaneously. For instance, each physical erasing unit is composed of 128 physical programming units. However, the invention is not limited thereto, and each of the physical erasing units may also be comprised of 64, 256, or any other number of physical programming units.

More specifically, the physical erasing unit is the smallest unit for erasing data; namely, each of the physical erasing units contains the least number of memory cells that are erased all together. The physical programming unit is the smallest unit for programming data; that is, each of the physical programming units is the smallest unit for writing data. Each physical programming unit usually includes a data bit area and a redundant bit area. The data hit area includes a plurality of physical access addresses for storing data of users, and the redundant bit area is configured for storing system data (e.g., control information and error correcting codes). In the present exemplary embodiment, each data bit area of the physical programming unit contains 4 physical access addresses, and the size of each physical access address is 512 bytes (512B). However, in other exemplary embodiments, 8, 16, or more or less number of the physical access addresses may be contained in the data bit area, and the number and the size of the physical access addresses are not limited in the invention. For instance, in an exemplary embodiment, the physical erasing units are physical blocks, and the physical programming units are physical pages or physical sectors, which should however not be construed as limitations to the invention.

In the present exemplary embodiment, the rewritable non-volatile memory chip 106 is a multi-level cell (MLC) NAND flash memory module (i.e., a flash memory module capable of storing data of at least 2 bits in one memory cell). However, the invention is not limited thereto, and the rewritable non-volatile memory chip 106 may also be a single-level cell (SLC) NAND flash memory module, a trinary-level cell (TLC) NAND flash memory module, any other flash memory module, or any other memory module with the same characteristics.

Figure 3:
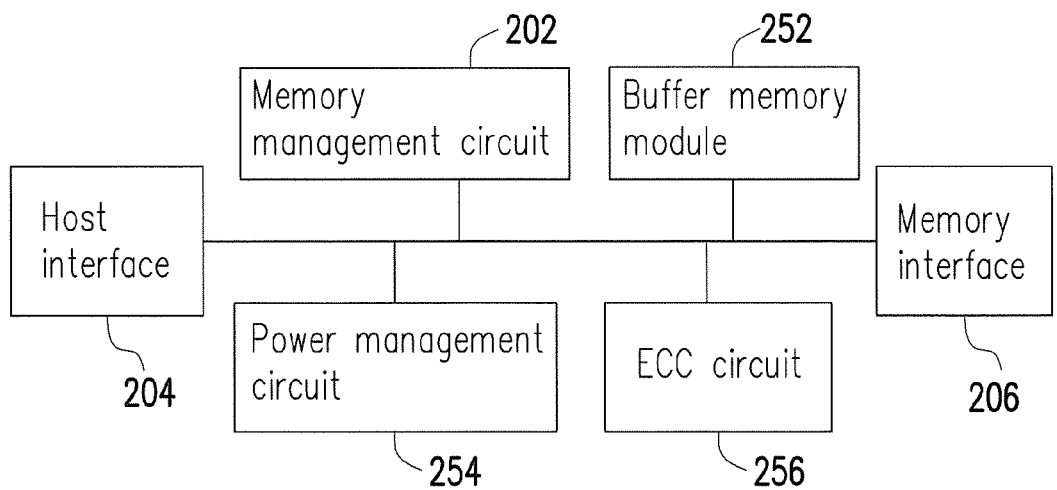
FIG. 3 is a simple block diagram illustrating a memory control circuit unit according to an exemplary embodiment of the present invention.

FIG. 3 is a schematic block diagram illustrating a memory control circuit unit according to an exemplary embodiment of the present invention.

With reference to FIG. 3, the memory control circuit unit 104 includes a memory management circuit 202, a host interface 204, and a memory interface 206.

The memory management circuit 202 is configured to control the overall operation of the memory control circuit unit 104. To be specific, the memory management circuit 202 has a plurality of control instructions, and the control instructions are executed to perform a data writing operation, a data reading operation, a data erasing operation and so on when the memory storage apparatus 100 is operated. The operations of the memory management circuit 202 are described below; in case that the operations of the memory management circuit 202 are similar to those of the memory control circuit unit 104, the relevant descriptions will be omitted.

In the present exemplary embodiment, the control instructions of the memory management circuit 202 are implemented in a firmware form. For instance, the memory management circuit 202 has a microprocessor unit (not shown) and a read-only memory (ROM, not shown), and these control instructions are burnt into the ROM. When the memory storage apparatus 100 is in operation, the control instructions are executed by the microprocessor unit to write, read, and erase data.

In another exemplary embodiment of the invention, the control instructions of the memory management circuit 202 may also be stored in a specific area of the rewritable non-volatile memory chip 106 (e.g., a system area of a memory module exclusively used for storing system data) in form of program codes. Additionally, the memory management circuit 202 has a microprocessor unit (not shown), a ROM (not shown), and a RAM (not shown). In particular, the ROM has boot codes, and when the memory control circuit unit 104 is enabled, the microprocessor unit first executes the boot codes to load the control instructions from the rewritable non-volatile memory chip 106 into the RAM of the memory management circuit 202. The microprocessor unit then runs the control instructions to write, read, and erase data.

Moreover, the control instructions of the memory management circuit 202 may also be implemented in a hardware form according to another exemplary embodiment of the invention. For instance, the memory management circuit 202 includes a microcontroller, a memory management unit circuit, a memory writing unit circuit, a memory reading unit circuit, a memory erasing unit circuit, and a data processing unit circuit. The memory management unit circuit, the memory writing unit circuit, the memory reading unit circuit, the memory erasing unit circuit, and the data processing unit circuit are coupled to the microcontroller. The memory management unit circuit is configured to manage physical erasing units of the rewritable non-volatile memory chip 106; the memory writing unit circuit is configured to issue a writing command to the rewritable non-volatile memory chip 106 for writing data thereto; the memory reading unit circuit is configured to issue a reading command to the rewritable non-volatile memory chip 106 for reading data therefrom; the memory erasing unit circuit is configured to issue an erasing command to the rewritable non-volatile memory chip 106 for erasing data therefrom; the data processing unit circuit is configured to process data to be written to the rewritable non-volatile memory chip 106 or data read from the rewritable non-volatile memory chip 106.

The host interface 204 is coupled to the memory management circuit 202 and configured to receive and identify commands and data transmitted by the host system 1000. Namely, the commands and data from the host system 1000 are transmitted to the memory management circuit 202 through the host interface 204. In the present exemplary embodiment, the host interface 204 complies with the SATA standard. However, it should be understood that the invention is not limited thereto, and the host interface 204 may comply with the PATA standard, the IEEE 1394 standard, the PCI express standard, the USB standard, the SD standard, the UHS-I interface standard, the UHS-II interface standard, the MS standard, the MMC standard, the eMMC interface standard, the UFS interface standard, the CF standard, the IDE standard, or other suitable data transmission standards.

The memory interface 206 is coupled to the memory management circuit 202 and configured to access the rewritable non-volatile memory chip 106. Namely, data to be written into the rewritable non-volatile memory chip 106 may be converted by the memory interface 206 into a format acceptable to the rewritable non-volatile memory chip 106.

In an exemplary embodiment of the present invention, the memory control circuit unit 104 further includes a buffer memory module 252, a power management circuit 254, and an error checking and correcting (ECC) circuit 256.

The buffer memory module 252 is coupled to the memory management circuit 202 and configured to temporarily hold data and commands received from the host system 1000 or data received from the rewritable non-volatile memory chip 106.

The power management circuit 254 is coupled to the memory management circuit 202 and configured to control the power supply of the memory storage apparatus 100.

The ECC circuit 256 is coupled to the memory management circuit 202 and configured to perform an ECC procedure to ensure data accuracy. To be specific, when the memory management circuit 202 receives a writing command from the host system 1000, the ECC circuit 256 generates an ECC code for data corresponding to the writing command, and the memory management circuit 202 writes the data and the corresponding ECC code into the rewritable non-volatile memory chip 106. Thereafter, when reading the data from the rewritable non-volatile memory chip 106, the memory management circuit 202 simultaneously reads the ECC code corresponding to the data, and the ECC circuit 256 performs the ECC procedure on the read data according to the corresponding ECC code.

Figure 4:
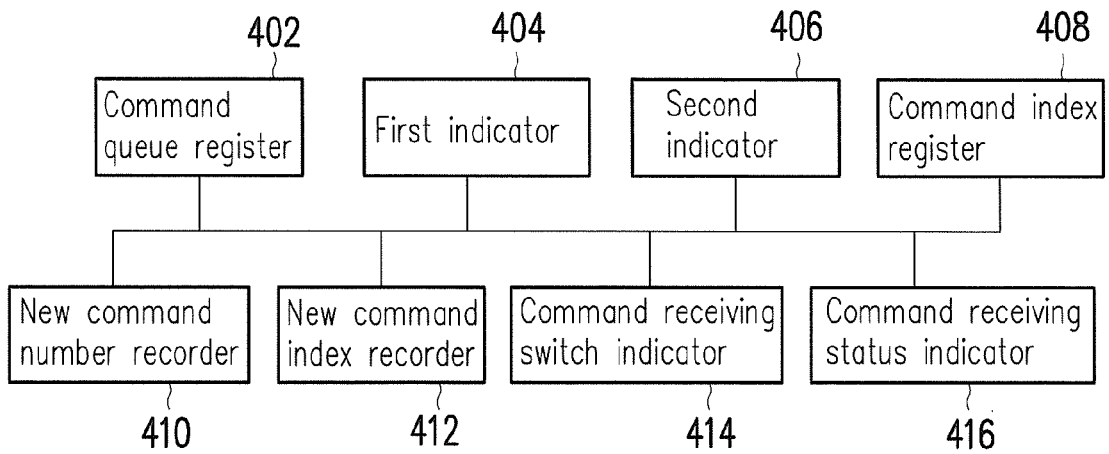
FIG. 4 is a schematic block diagram illustrating a buffer memory module according to an exemplary embodiment of the present invention.

FIG. 4 is a schematic block diagram illustrating a buffer memory module according to an exemplary embodiment of the present invention. With reference to FIG. 4, the memory control circuit unit 104 (or the memory management circuit 202) may configure a command queue register 402, a first indicator 404, a second indicator 406, and a command index register 408 in the buffer memory module 252.

The command queue register 402 is configured to store commands received by the memory control circuit unit 104 (or the memory management circuit 202) from the host system 1000. Specifically, the command queue register 402 includes a plurality of command transient units, each of which is configured to store one command. Each of the command transient units has a command index. That is, each command index in fact points to one of the command transient units (or the register address of one of the command transient units).

The first indicator 404 is configured to store a plurality of first indication bits. Specifically, when the memory control circuit unit 104 (or the memory management circuit 202) receives one or more commands from the host system 1000, the memory control circuit unit 104 (or the memory management circuit 202) may query the first indication bits in the first indicator 404, so as to store the command(s) into one or more command transient units of the command queue register 402 according to the query result. In the present exemplary embodiment, the first indicator 404 may be configured to indicate the storage status of the command queue register 402. It should be mentioned that the wording "according to" herein means "at least by means of." For instance, as described above, the memory control circuit unit 104 may "store the command(s) into one or more command transient units of the command queue register 402 according to the query result", which means that the memory control circuit unit 104 may determine whether the next step is performed or not simply by means of the query result; alternatively, the query result is merely one of the factors considered by the memory control circuit unit 104.

The second indicator 406 is configured to store a plurality of second indication bits. Specifically, according to the second indication bits in the second indicator 406, the memory control circuit unit 104 (or the memory management circuit 202) is able to obtain the number of the commands received from the host system 1000 each time or the number of the commands in the command queue. In the present exemplary embodiment, the number of the first indication bits and the number of the second indication bits are respectively equal to the number of the command transient units of the command queue register 402. The second indicator 406 described herein may be configured to indicate the number of the latest commands received from the host system 1000 and the command indices corresponding to the latest commands received from the host system 1000.

It should be understood that the number of the first indication bits and the number of the second indication bits may be respectively less than the number of the command transient units of the command queue register 402 according to another exemplary embodiment.

The command index register 408 is configured to store the command indices. Particularly, the command indices that are stored in the command index register 408 and correspond to the un-executed commands are arranged in an order according to the information conducive to the order arrangement, e.g., the time of receiving the corresponding commands and/or whether the memory addresses storing the commands are continuous. According to the order, the memory control circuit unit 104 (or the memory management circuit 202) sequentially reads the command indices that are stored in the command index register 408 and correspond to the un-executed commands, and the memory control circuit unit 104 (or the memory management circuit 202) then obtains corresponding command transient units of the command queue register 402 according to the read command indices. After that, the memory control circuit unit 104 (or the memory management circuit 202) is able to execute the commands stored in the obtained command transient units.

Figure 5:
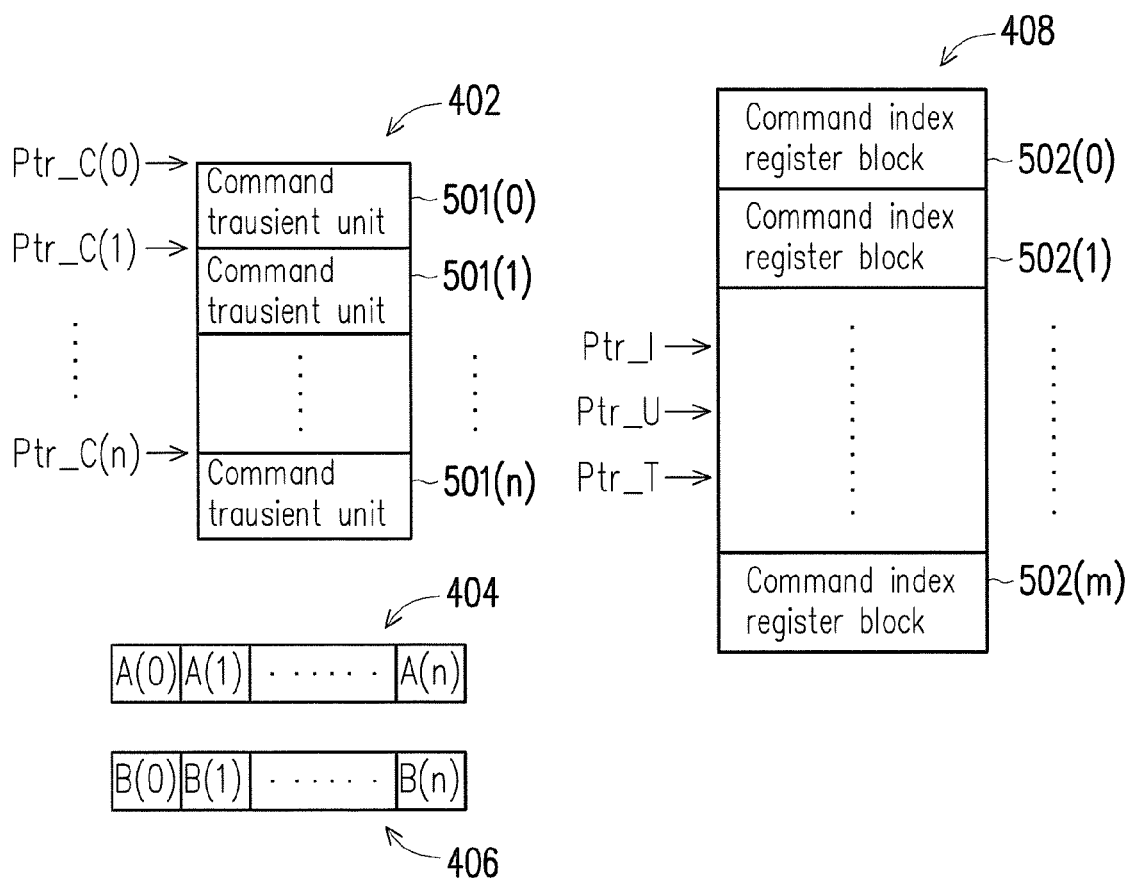
FIG. 5 schematically illustrates a command queue register, a first indicator, a second indicator, and a command index register according to an exemplary embodiment of the present invention.

FIG. 5 schematically illustrates a command queue register, a first indicator, a second indicator, and a command index register according to an exemplary embodiment of the present invention.

With reference to FIG. 5, the command queue register 402 includes a plurality of command transient units 501(0) to 501(n) and a plurality of command indices Ptr_C(0) to Ptr_C (n). Each of the command transient units 501(0) to 501(n) is configured to store one command, and the command indices Ptr_C(0) to Ptr_C(n) respectively points to the command transient units 501(0) to 501(n) (or the register address of the command transient units 501(0) to 501(n)). That is, given that the command queue register 402 includes (n+1) command transient units 501(0) to 501(n), the command queue register 402 can simultaneously hold at most (n+1) commands.

The first indicator 404 stores first indication bits A(0) to A(n), and the second indicator 406 stores second indication bits B(0) to B(n).

The command index register 408 includes a plurality of command index register blocks 502(0) to 502(m). Each of the command index register blocks 502(0) to 502(m) is configured to store one command index. Besides, the command index register 408 has a start index Ptr_I, an end index Ptr_T, and an outstanding command index Ptr_U.

For illustrative purposes, the present exemplary embodiment is elaborated on the condition that n=7. However, in another exemplary embodiment of the present invention, n may be a positive integer smaller than or larger than 7 and should not be limited in the invention. The first bit status is assumed to be "1," and the second bit status is assumed to be "0." However, in another exemplary embodiment of the present invention, the first bit status may be "0," and the second bit status may be "1," which should not be construed as a limitation to the present invention.

Figure 6:
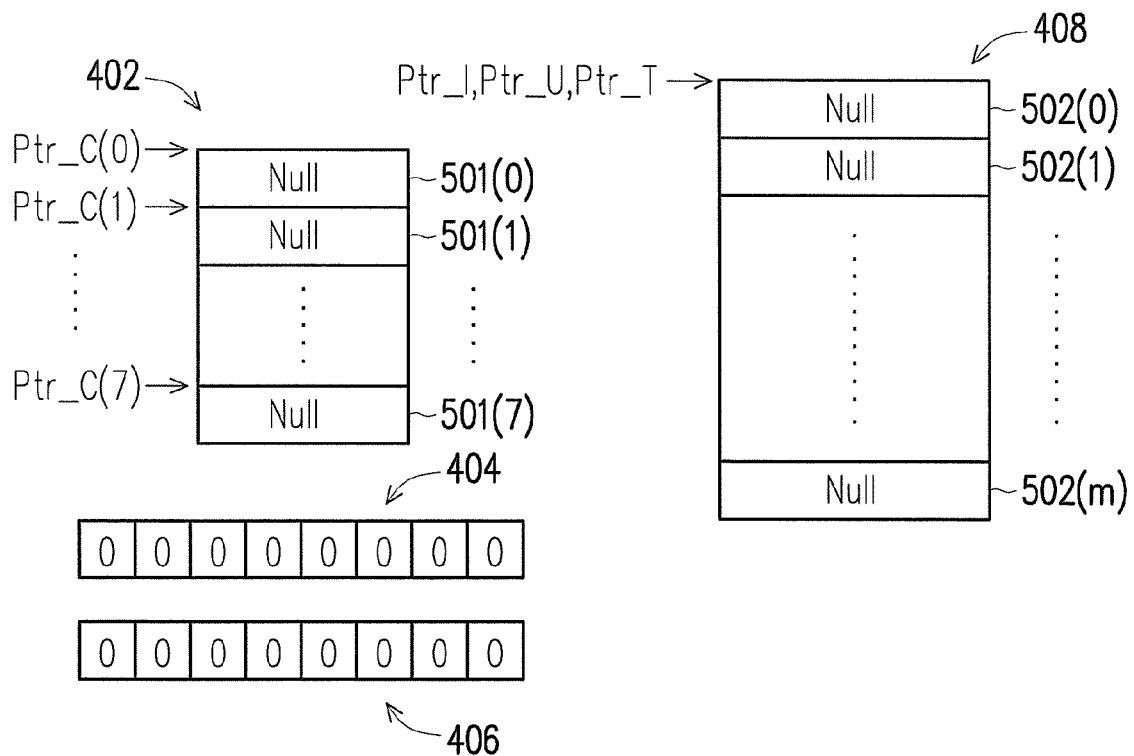
FIG. 6 schematically illustrates an initialized command queue register, a first indicator, a second indicator, and a command index register according to an exemplary embodiment of the present invention.

FIG. 6 schematically illustrates an initialized command queue register, a first indicator, a second indicator, and a command index register according to an exemplary embodiment of the present invention.

With reference to FIG. 6, the default values stored in the command transient units 501(0) to 501(7) of the command queue register 402 are presented by "Null," and the command indices Ptr_C(0) to Ptr_C(7) respectively point to the command transient units 501(0) to 501(7). The default values of the first indication bits A(0) to A(7) stored in the first indicator 404 and the default values of the second indication bits B(0) to B(7) stored in the second indicator 406 are all "0" (i.e., the second bit status). The default values stored in the command index register blocks 502(0) to 502(m) of the command index register 408 are also presented by "Null," and all of the start index Ptr_I, the end index Ptr_T, and the outstanding command index Ptr_U initially point to the command index register block 502(0). However, in another exemplary embodiment, if no initialization process is performed, the value stored in each of the command transient units 501(n) to 501(7) and the command index register blocks 502(0) to 502(m) may be any value and should not be limited in the present invention.

In particular, when the memory control circuit unit 104 (or the memory management circuit 202) receives one or more commands (collectively referred to as the first command hereinafter) from the host system 1000 in one command queue receiving process, the memory control circuit unit 104 (or the memory management circuit 202) is able to store the first command in the command queue register 402 according to the first indication bits A(0) to A(7) in the first indicator 404 and update the first indication bits A(0) to A(7) according to the current storage status of the command queue register 402 or the usage status of the command transient units 501(0) to 501(7).

It should be mentioned the "one command queue receiving process" means that the memory control circuit unit 104 (or the memory management circuit 202) receives a batch of commands and stores the same in the command queue at one time; however, the present invention is not limited thereto.

Figure 7:
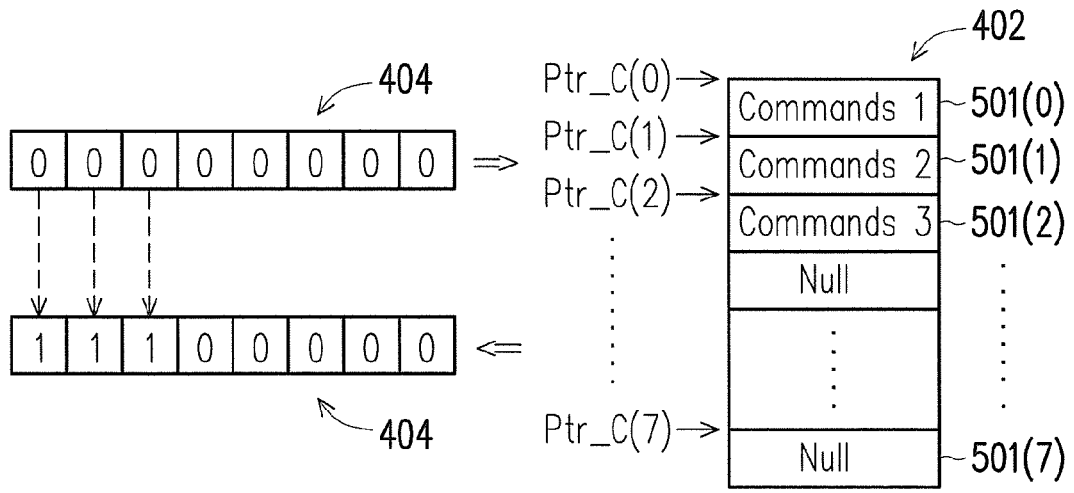
FIG. 7 is a schematic diagram of storing the first command and updating the first indication bits according to an exemplary embodiment of the present invention.

FIG. 7 is a schematic diagram of storing the first command (s) and updating the first indication bits according to an exemplary embodiment of the present invention.

With reference to FIG. 7, in one command queue receiving process, the memory control circuit unit 104 (or the memory management circuit 202) is assumed to receive commands 1, 2, and 3 from the host system 1000. Before the commands 1, 2, and 3 are stored, the memory control circuit unit 104 (or the memory management circuit 202) looks the first indicator 404 up and sequentially identifies the first indication bits A(0) to A(7) (starting from the first indication bit A(0)) and determines whether the first indication bits A(0) to A(7) are in the first bit status. If the currently identified first indication bit is not in the first bit status, the memory control circuit unit 104 (or the memory management circuit 202) stores one of the received-but-not-stored first commands into the command transient unit corresponding to the currently identified first indication bit in the command queue register 402. Additionally, if the currently identified first indication bit is in the first bit status, the memory control circuit unit 104 (or the memory management circuit 202) continues to identify the next first indication bit until the first indication bit A(7) is identified.

Here, the first bit status is assumed to be "1," and the second bit status is assumed to be "0." Since the first indication bits A(0) to A(2) are recorded to be in the second bit status, the memory control circuit unit 104 (or the memory management circuit 202) stores the command 1 in the command transient unit 501(0) corresponding to the first indication bit A(0), stores the command 2 in the command transient unit 501(1) corresponding to the first indication bit A(1), and stores the command 3 in the command transient unit 501(2) corresponding to the first indication bit A(2).

After the commands 1, 2, and 3 are respectively written into the command transient units 501(0) to 501(2), the memory control circuit unit 104 (or the memory management circuit 202) updates the first indication bits A(0) to A(2) to be in the first bit status (i.e., "1"), so as to indicate that the first commands (i.e., the un-executed commands) that cannot be erased or rewritten are already stored in the command transient units 501(0) to 501(2).

According to the updated first indication bits A(0) to A(7) and the second indication bits B(0) to B(7) in the second indicator 406, the memory control circuit unit 104 (or the memory management circuit 202) updates the second indication bits B(0) to B(7).

To be specific, the memory control circuit unit 104 (or the memory management circuit 202) is able to execute an exclusive OR (XOR) operation on the first indication bits A(0) to A(7) and the second indication bits B(0) to B(7) and generate the updated second indication bits B(0) to B(7) according to a result of the XOR operation. The memory control circuit unit 104 (or the memory management circuit 202) may then re-write the updated second indication bits B(0) to B(7) into the second indicator 406.

Figure 8:
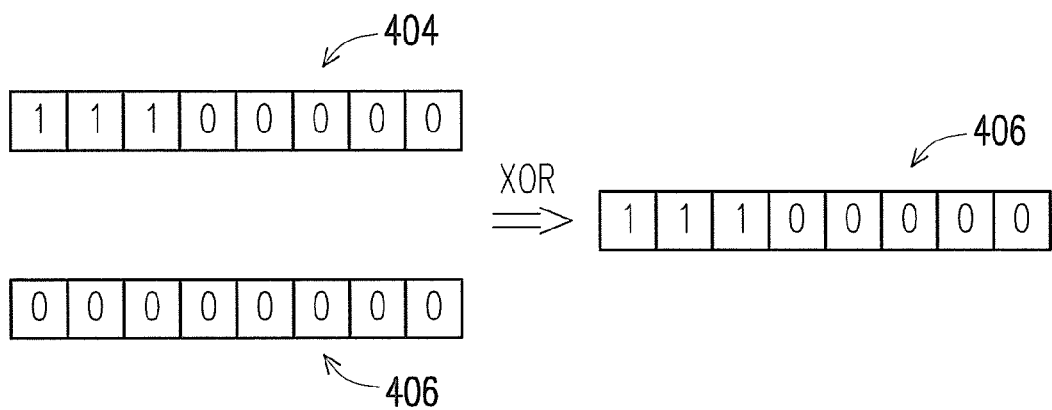
FIG. 8 is a schematic diagram of executing an XOR operation according to an exemplary embodiment of the present invention.

FIG. 8 is a schematic diagram of executing an XOR operation according to an exemplary embodiment of the present invention.

With reference to FIG. 8, the memory control circuit unit 104 (or the memory management circuit 202) executes an XOR operation on the first indication bits (i.e., "11100000") in the first indicator 404 and the second indication bits (i.e., "00000000") in the second indicator 406, so as to generate the updated second indication bits (i.e., "11100000") and write the updated second indication bits (i.e., "11100000") into the second indicator 406.

According to the updated second indication bits B(0) to B(7), the memory control circuit unit 104 (or the memory management circuit 202) obtains the number of the first commands and the command indices Ptr_C(0), Ptr_C(1), and Ptr_C(2) (collectively referred to as the first command indices hereinafter) corresponding to the command transient units 501(0) to 501(2) storing the first commands in the command queue register 402.

With reference to FIG. 4, the memory control circuit unit 104 (or the memory management circuit 202) described herein may further configure a new command number recorder 410 and a new command index recorder 412 in the buffer memory module 252.

The new command number recorder 410 may store a plurality of third indication bits for recording the number of the first commands.

The new command index recorder 412 includes a plurality of command index register blocks for storing the first command indices.

In particular, the memory control circuit unit 104 (or the memory management circuit 202) may calculate the number of the updated second indication bits, which are recorded as the first bit status (i.e., "1") to obtain the number of the first commands, and the memory control circuit unit 104 (or the memory management circuit 202) records the number of the first commands in the new command number recorder 410 by means of the third indication bits. Additionally, the memory control circuit unit 104 (or the memory management circuit 202) may record the first command indices in the new command index recorder 412.

Figure 9:
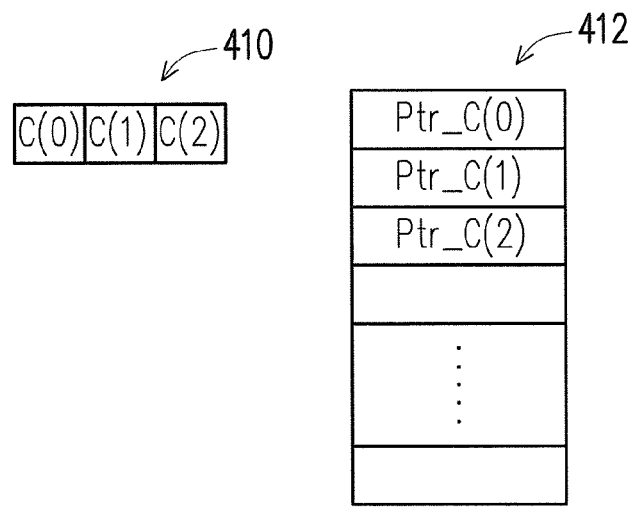
FIG. 9 schematically illustrates the new command number recorder and the new command index recorder according to an exemplary embodiment of the present invention.

FIG. 9 schematically illustrates the new command number recorder and the new command index recorder according to an exemplary embodiment of the present invention.

With reference to FIG. 8 and FIG. 9, in the second indicator 406, the second indication bits B(0), B(1), and B(2) are in the first bit status (i.e., "1"), and therefore the number of the first commands obtained by the memory control circuit 104 (or the memory management circuit 202) is "3," and the third indication bits C(0), C(1), and C(2) in the new command number recorder 410 are respectively set as "0," "1," and "1", so as to represent that the number of the first commands is 3. In addition, the memory control circuit unit 104 (or the memory management circuit 202) records the command indices Ptr_C(0) to Ptr_C(2) in the new command index recorder 412.

After obtaining the number of the first commands and the first command indices, the memory control circuit unit 104 (or the memory management circuit 202) replaces the second indication bits B(0) to B(7) in the second indicator 406 with the first indication bits A(0) to A(7) in the first indicator 404.

On the other hand, after obtaining the number of the first commands and the first command indices, the memory control circuit unit 104 (or the memory management circuit 202) adds the first command indices to the command index register 408 and updates the end index Ptr_T in the command index register 408 according to the number of the first commands. The memory control circuit unit 104 (or the memory management circuit 202) may then sequentially read the command indices (collectively referred to as the un-executed command indices) corresponding to the commands that are stored in the command queue register 402 and are not executed yet, so as to execute the commands that correspond to the un-executed command indices and are stored in the corresponding command queue blocks of the command queue register 402.

In another exemplary embodiment of the present invention, the memory control circuit unit 104 (or the memory management circuit 202) may rearrange an execution order of the un-executed command indices according to the outstanding command index Ptr_U and the end index Ptr_T in the command index register 408. For instance, the execution order of the un-executed command indices may be determined according to the information conducive to the order arrangement, e.g., the time of receiving the un-executed command indices and/or whether the memory addresses storing the commands are continuous. After the execution order is determined, the memory control circuit unit 104 (or the memory management circuit 202) sequentially reads the un-executed command indices from the command index register 408 according to the execution order, so as to execute the commands which are stored in the corresponding command transient units of the command queue register 402 and correspond to the un-executed command indices.

In particular, the memory control circuit unit 104 (or the memory management circuit 202) obtains the un-executed command indices according to the outstanding command index Ptr_U and the end index Ptr_T. According to different command storage and execution statuses, the un-executed command index may merely include the first command index. Alternatively, the un-executed command indices may simultaneously include the first command indices and the command indices corresponding to other un-executed commands stored in the command queue register 402.

Figure 10:
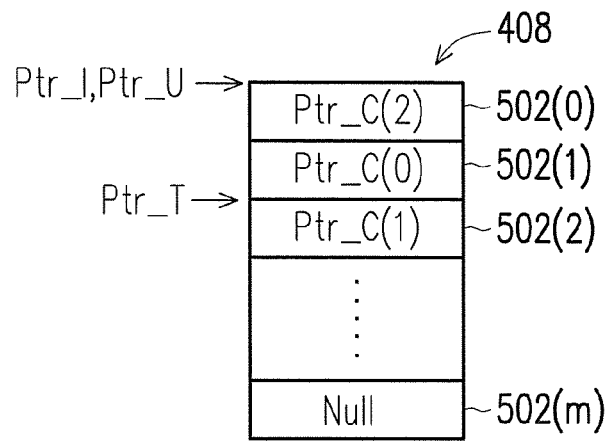
FIG. 10 is a schematic diagram of adding the command index to the command index register and updating the end index according to an exemplary embodiment of the present invention.

FIG. 10 is a schematic diagram of adding a command index to a command index register and updating an end index according to an exemplary embodiment of the present invention.

With reference to FIG. 10, after obtaining the number of the first commands (i.e., "3") and the command indices Ptr_C(0) to Ptr_C(2), the memory control circuit unit 104 (or the memory management circuit 202) may add the command indices Ptr_C(0) to Ptr_C(2) to the command index register 408 and switch the end index Ptr_T pointing to the command index register block 502(0) to the end index Ptr_T pointing to the command index register block 502(2). For instance, 3 may be added to the end index Ptr_T.

Here, the outstanding command index Ptr_U points to the command index register block 502(0), and the end index Ptr_T points to the command index register block 502(2). Hence, the memory control circuit unit 104 (or the memory management circuit 202) considers the command indices Ptr_C(0) to Ptr_C(2) recorded in the command index register blocks 502(0) to 502(2) as the command indices that are not read yet. After that, the memory control circuit unit 104 (or the memory management circuit 202) sequentially determines an order of the command indices Ptr_C(0) to Ptr_C(2). For instance, the order of the command indices Ptr_C(0) to Ptr_C(2) may be determined according to the information conducive to the order arrangement, e.g., the time of receiving the commands 1, 2, and 3 and/or whether the memory addresses storing the commands are continuous. In the present exemplary embodiment, if the commands 3, 1, and 2 are determined to be sequentially executed according to the priority of these commands, the command index Ptr_C(2) corresponding to the command 3 is stored in the command index register block 502(0), the command index Ptr_C(0) corresponding to the command 1 is stored in the command index register block 502(1), and the command index Ptr_C(1) corresponding to the command 2 is stored in the command index register block 502(2).

The memory control circuit unit 104 (or the memory management circuit 202) then reads the command index Ptr_C(2) from the command index register block 502(0), so as to read and execute the command 3 stored in the command transient unit 501(2). After that, the memory control circuit unit 104 (or the memory management circuit 202) reads the command index Ptr_C(0) from the command index register block 502(1), so as to read and execute the command 1 stored in the command transient unit 501(0). Thereafter, the memory control circuit unit 104 (or the memory management circuit 202) reads the command index Ptr_C(1) from the command index register block 502(2), so as to read and execute the command 2 stored in the command transient unit 501(1).

Besides, as long as the memory control circuit unit 104 (or the memory management circuit 202) is about to execute the next command, the memory control circuit unit 104 (or the memory management circuit 202) updates the outstanding command index Ptr_U (e.g., by adding "1" to the outstanding command index Ptr_U).

For instance, the outstanding command index Ptr_U is assumed to initially point to the command index register block 502(0). If the memory control circuit unit 104 (or the memory management circuit 202) is about to execute the next command, the memory control circuit unit 104 (or the memory management circuit 202) switches the outstanding command index Ptr_U pointing to the command index register block 502(0) to the outstanding command index Ptr_U pointing to the command index register block 502(1), so as to read the command index Ptr_C(0). Thereafter, if the memory control circuit unit 104 (or the memory management circuit 202) is about to execute the next command, the memory control circuit unit 104 (or the memory management circuit 202) continuously switches the outstanding command index Ptr_U pointing to the command index register block 502(1) to the outstanding command index Ptr_U pointing to the command index register block 502(2), so as to read the command index Ptr_C(1).

In another aspect, if a command which is in the command queue register 402 and corresponds to a specific command index stored in the command index register 408 is completely executed and ready to be rewritten by a new command, the memory control circuit unit 104 (or the memory management circuit 202) may update the start index Ptr_I in the command index register 408, the first indication bits A(0) to A(7) in the first indicator 404, and the second indication bits B(0) to B(7) in the second indicator 406 according to the specific command index.

Figure 11:
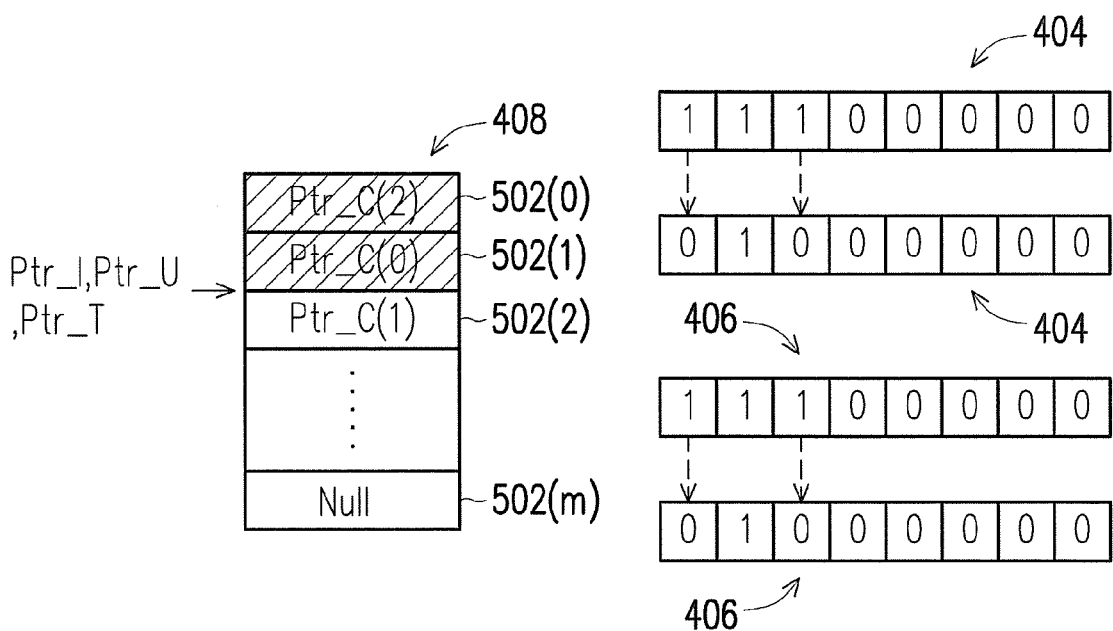
FIG. 11 is a schematic diagram of updating the start index, the first indication bits, and the second indication bits according to an exemplary embodiment of the present invention.

FIG. 11 is a schematic diagram of updating a start index, first indication bits, and second indication bits according to an exemplary embodiment of the present invention.

With reference to FIG. 11, if the commands 3 and 1 are sequentially or simultaneously executed and are ready to be erased from the command queue register 402 or rewritten by new commands, the memory control circuit unit 104 (or the memory management circuit 202) may switch the start index Ptr_I to point to the command index register block 502(1) and update the first indication bits A(0) and A(2) in the first indicator 404 and the second indication bits B(0) and B(2) in the second indicator 406 to be in the second bit status (i.e., "0"), so as to indicate that new commands can now be stored in the command transient units 501(0) and 501(2).

The above descriptions are provided on the exemplary condition that the command queue register 402, the first indicator 404, the second indicator 406, and the command index register 408 are all initialized. However, the implementation manner described herein remains unchanged regardless of whether the command queue register 402, the first indicator 404, the second indicator 406, and the command index register 408 are initialized. In view of the above, the condition that the command queue register 402, the first indicator 404, the second indicator 406, and the command index register 408 are not initialized is elucidated hereinafter.

In particular, if the memory control circuit unit 104 (or the memory management circuit 202) receives another command or other commands (collectively referred to as the second command hereinafter) from the host system 1000 in another command queue receiving process, the memory control circuit unit 104 (or the memory management circuit 202) is also able to store the second command in the command queue register 402 according to the first indication bits A(0) to A(7) in the first indicator 404 and update the first indication bits A(0) to A(7) according to the current storage status of the command queue register 402 or the usage status of the command transient units 501(0) to 501(7).

Figure 12:
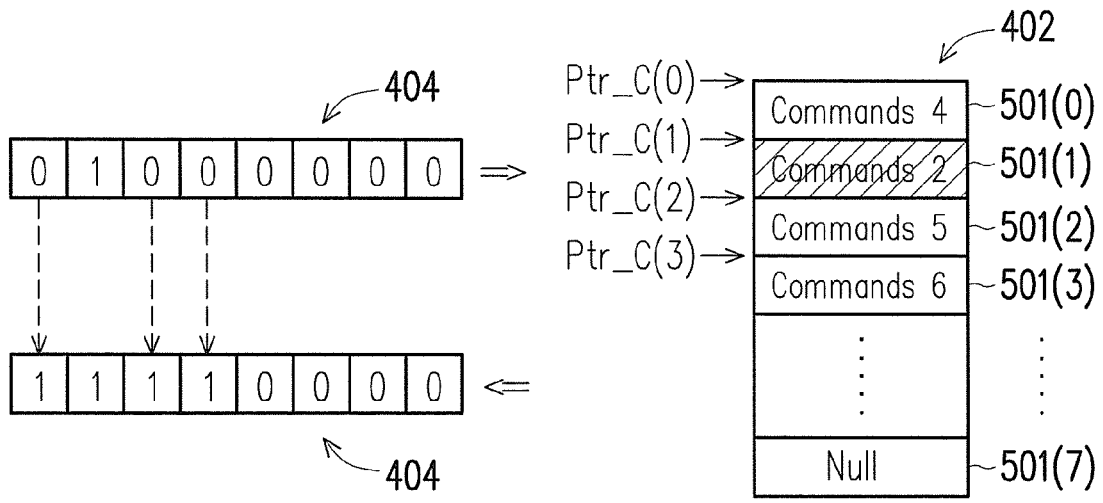
FIG. 12 is a schematic diagram of storing the second command and updating the first indication bits according to an exemplary embodiment of the present invention.
Figure 13:
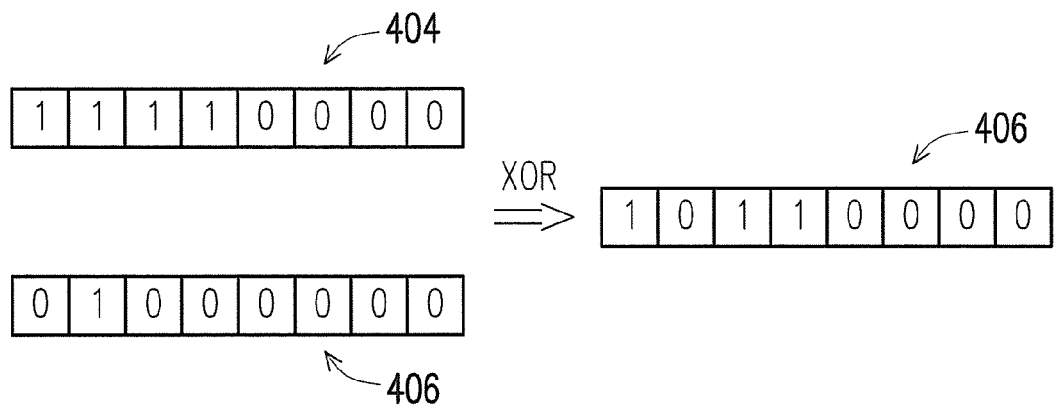
FIG. 13 is a schematic diagram of executing another XOR operation according to an exemplary embodiment of the present invention.

FIG. 12 is a schematic diagram of storing the second command and updating the first indication bits according to an exemplary embodiment of the present invention. FIG. 13 is a schematic diagram of executing another XOR operation according to an exemplary embodiment of the present invention.

With reference to FIG. 12, in another command queue receiving process, the memory control circuit unit 104 (or the memory management circuit 202) is assumed to receive commands 4, 5, and 6 from the host system 1000. Since the first indication bits A(0), A(2), and A(3) in the first indicator 404 are in the second bit status (i.e., "0"), the memory control circuit unit 104 (or the memory management circuit 202) writes the command 4 into the command transient unit 501(0) corresponding to the first indication bit A(0), writes the command 5 into the command transient unit 501(2) corresponding to the first indication bit A(2), and writes the command 6 into the command transient unit 501(3) corresponding to the first indication bit A(3). Besides, according to the current storage status of the command queue register 402 or the usage status of the command transient units 501(0) to 501(7), the memory control circuit unit 104 (or the memory management circuit 202) is able to update the first indication bits A(0) to A(7). That is, the memory control circuit unit 104 (or the memory management circuit 202) may update the first indication bits A(0), A(2), and A(3) to be in the first bit status (i.e., "1") from the second bit status (i.e., "0").

With reference to FIG. 13, the memory control circuit unit 104 (or the memory management circuit 202) executes an XOR operation on the first indication bits (i.e., "11110000") in the first indicator 404 and the second indication bits (i.e., "01000000") in the second indicator 406, so as to generate the updated second indication bits (i.e., "10110000"). According to the updated second indication bits (i.e., "10110000"), the memory control circuit unit 104 (or the memory management circuit 202) learns that the number of the second commands is "3" and obtains the command indices Ptr_C(0), Ptr_C(2), and Ptr_C(3) from the common indices Ptr_C(0) to Ptr_C(7). Here, the command indices Ptr_C(0), Ptr_C(2), and Ptr_C(3) are collectively referred to as the second command indices hereinafter and correspond to the command transient units 501(0), 501(2), and 501(3) storing the second commands in the command queue register 402.

Figure 14:
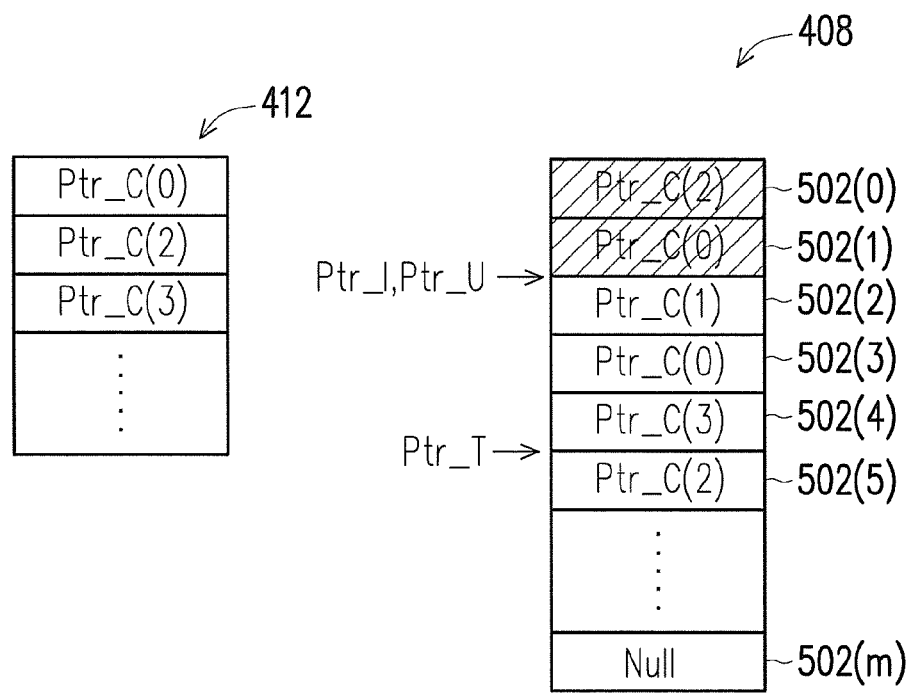
FIG. 14 is a schematic diagram of adding another command index to the command index register and updating the end index according to an exemplary embodiment of the present invention.

FIG. 14 is a schematic diagram of adding another command index to the command index register and updating the end index according to an exemplary embodiment of the present invention.

With reference to FIG. 14, after obtaining the number of the second commands (i.e., "3") and the command indices Ptr_C(0), Ptr_C(2), and Ptr_C(3), the memory control circuit unit 104 (or the memory management circuit 202) may add the command indices Ptr_C(0), Ptr_C(2), and Ptr_C(3) to the command index register 408 and switch the end index Ptr_T pointing to the command index register block 502(2) to the end index Ptr_T pointing to the command index register block 502(5) according to the number of the second commands (i.e., "3"). For instance, 3 may be added to the end index Ptr_T.

Here, the outstanding command index Ptr_U points to the command index register block 502(2), and the end index Ptr_T points to the command index register block 502(5). Hence, the memory control circuit unit 104 (or the memory management circuit 202) considers the command indices Ptr_C(0) to Ptr_C(3) recorded in the command index register blocks 502(2) to 502(5) as the command indices that are not read yet. After that, the memory control circuit unit 104 (or the memory management circuit 202) sequentially determines an order of the command indices Ptr_C(0) to Ptr_C(3). For instance, the order of the command indices Ptr_C(0) to Ptr_C(3) may be determined according to the information conducive to the order arrangement, e.g., the time of receiving the commands 2 and 4-6 and/or whether the memory addresses storing the commands are continuous. In the present exemplary embodiment, if the commands 2, 4, 6, and 5 are determined to be sequentially executed according to the priority of these commands, the command index Ptr_C(1) is stored in the command index register block 502(2), the command index Ptr_C(0) is stored in the command index register block 502(3), the command index Ptr_C(3) is stored in the command index register block 502(4), and the command index Ptr_C(2) is stored in the command index register block 502(5).

The memory control circuit unit 104 (or the memory management circuit 202) then sequentially reads the command indices Ptr_C(0) to Ptr_C(3) from the command index register blocks 502(2) to 502(5), executes the corresponding commands, and correspondingly updates the outstanding command index Ptr_U, the start index Ptr_I, and the end index Pt T, which will not be further elaborated hereinafter.

Note that the command index register 408 described herein is a ring-shaped command index register. That is, if the outstanding command index Ptr_U, the start index Ptr_I, and/or the end index Ptr_T already point to the command index register block 502(*m*) and will be further switched to point to another command index register block, the outstanding command index Ptr_U, the start index Ptr_I, and/or the end index Ptr_T pointing to the command index register block 502(*m*) may then be switched back to point to the command index register block 502(0) and may continue to be switched to point to the command index register block 502(1) and/or the command index register block 502(2). In addition, when the command index is added to the command index register 408, if the to-be-added command indices already point to the command index register block 502(*m*), the following command indices are sequentially written into the command index register block 502(0) and then into the subsequent command index register blocks due to the properties of the ring-shaped command index register.

However, the present invention is not limited to aforesaid embodiments. With reference to FIG. 4, the memory control circuit unit 104 (or the memory management circuit 202) described herein may further configure a command receiving switch indicator 414 and a command receiving status indicator 416 in the buffer memory module 252.

The command receiving switch indicator 414 is configured to store a switch indication bit. If the memory control circuit unit 104 (or the memory management circuit 202) intends to stop receiving any command from the host system 1000, the memory control circuit unit 104 (or the memory management circuit 202) switches the switch indication bit in the command receiving switch indicator 414 to be in a status of being unable to receive any command. For instance, the switch indication bit is set as "0." By contrast, if the memory control circuit unit 104 (or the memory management circuit 202) intends to receive a command from the host system 1000, the memory control circuit unit 104 (or the memory management circuit 202) switches the switch indication bit in the command receiving switch indicator 414 to be in a status of being able to receive commands. For instance, the switch indication bit is set as "1." The actual settings may be adjusted according to actual requirements and will not be limited in the present invention.

The command receiving status indicator 416 is configured to store a status indication bit. Specifically, the status indication bit is configured to reflect whether the memory control circuit unit 104 (or the memory management circuit 202) is receiving a command or not. If the status indication bit is in a status of being receiving a command, it indicates that the memory control circuit unit 104 (or the memory management circuit 202) is receiving a command from the host system 1000. By contrast, if the status indication bit is not in the status of being receiving a command, it indicates that the memory control circuit unit 104 (or the memory management circuit 202) is not receiving a command from the host system 1000.

In the present exemplary embodiment, the memory control circuit unit 104 (or the memory management circuit 202) may determine whether the status indication bit in the command receiving status indicator 416 is in the status of being receiving a command. If not, the memory control circuit unit 104 (or the memory management circuit 202) updates the first indication bits and/or the second indication bits, e.g., generates the updated second indication bits according to the first indication bits in the first indicator 404 and the second indication bits in the second indicator 408. By contrast, if the status indication bit in the command receiving status indicator 416 is in the status of being receiving a command, the memory control circuit unit 104 (or the memory management circuit 202) does not update the first indication bits and/or the second indication bits. Thereby, no new command is received during the process of updating the first indication bits and/or the second indication bits, such that the receipt of commands does not interfere with the management of the command queue.

In the previous exemplary embodiments, the command queue register 402, the first indicator 404, the second indicator 406, the command index register 408, the new command number recorder 410, the new command index recorder 412, the command receiving switch indicator 414, and the command receiving status indicator 416 are all configured in the buffer memory module 252. Nevertheless, in another exemplary embodiment of the present invention, the command queue register 402, the first indicator 404, the second indicator 406, the command index register 408, the new command number recorder 410, the new command index recorder 412, the command receiving switch indicator 414, and the command receiving status indicator 416 may also be configured in the rewritable non-volatile memory chip 106 that may be accessed by the memory control circuit unit 104 (or the memory management circuit 202). In yet another exemplary embodiment, the command queue register 402, the first indicator 404, the second indicator 406, the command index register 408, the new command number recorder 410, the new command index recorder 412, the command receiving switch indicator 414, and the command receiving status indicator 416 may also be implemented in a hardware form and may be configured in a register in the memory storage apparatus 100.

Figure 15:
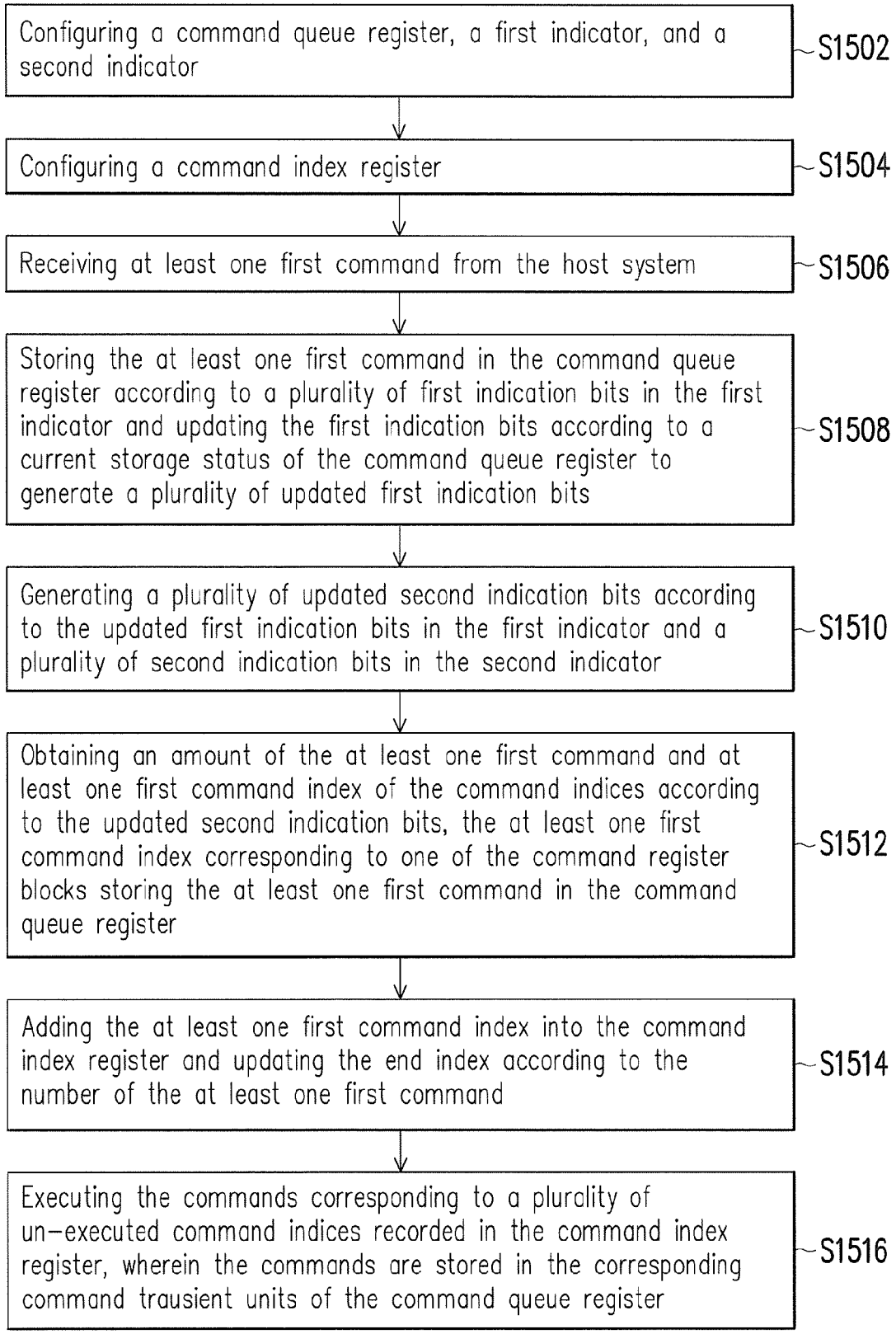
FIG. 15 is a flow chart illustrating a method for managing commands in a command queue according to an exemplary embodiment of the present invention.

FIG. 15 is a flow chart illustrating a method for managing commands in a command queue according to an exemplary embodiment of the present invention.

With reference to FIG. 15, in step S1502, the memory control circuit unit 104 (or the memory management circuit 202) configures the command queue register 402, the first indicator 404, and the second indicator 406.

In step S1504, the memory control circuit unit 104 (or the memory management circuit 202) configures the command index register 408.

The order of performing the steps S1502 and S1504 is not limited in the invention. In another exemplary embodiment, the step S1504 may be performed before the step S1502 is performed.

In step S1506, the memory control circuit unit 104 (or the memory management circuit 202) receives at least one first command from the host system 1000.

In step S1508, the memory control circuit unit 104 (or the memory management circuit 202) stores the at least one first command in the command queue register 402 according to the first indication bits in the first indicator 404 and updates the first indication bits according to the current storage status of the command queue register 402 to generate a plurality of updated first indication bits.

In step S1510, the memory control circuit unit 104 (or the memory management circuit 202) generates a plurality of updated second indication bits according to the updated first indication bits in the first indicator 404 and a plurality of second indication bits in the second indicator 406.

In step S1512, the memory control circuit unit 104 (or the memory management circuit 202) obtains the number of the at least one first command and at least one first command index of the command indices according to the updated second indication bits. Here, the at least one first command index corresponds to at least one command transient unit storing the at least one first command in the command queue register 402.

In step S1514, the memory control circuit unit 104 (or the memory management circuit 202) adds the at least one first command index into the command index register 408 and updates the end index in the command index register 408 according to the number of the at least one first command.

In step S1516, the memory control circuit unit 104 (or the memory management circuit 202) executes the commands corresponding to a plurality of un-executed command indices recorded in the command index register 408, and the commands are stored in the corresponding command transient units of the command queue register 402.

Figure 16:
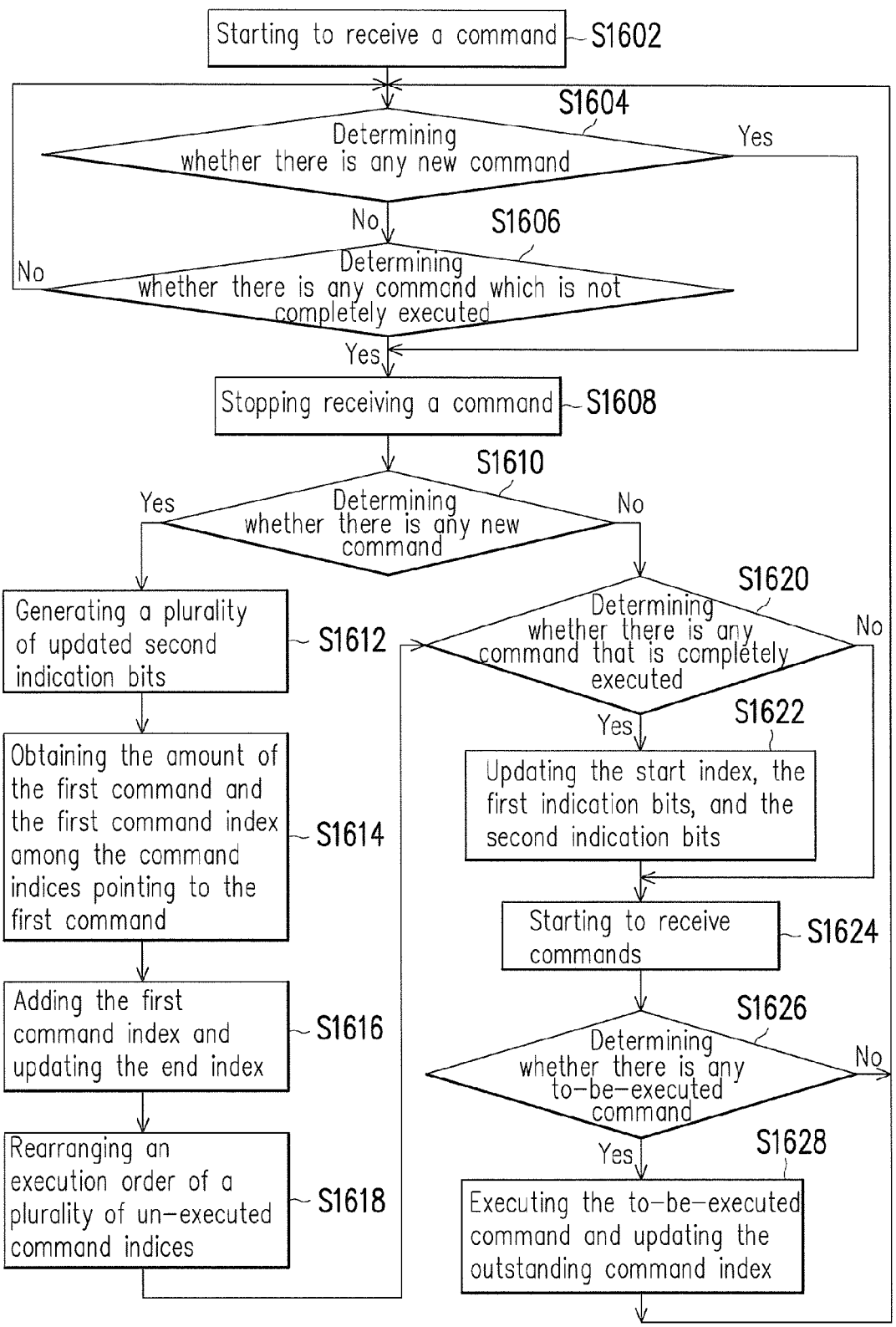
FIG. 16 is a flow chart illustrating a method for managing commands in a command queue according to another exemplary embodiment of the present invention.

FIG. 16 is a flow chart illustrating a method for managing commands in a command queue according to another exemplary embodiment of the present invention.

With reference to FIG. 16, in step S1602, the memory control circuit unit 104 (or the memory management circuit 202) starts to receive a command. For instance, the memory control circuit unit 104 (or the memory management circuit 202) may switch the switch indication bit in the command receiving switch indicator 414 to be in the status of being able to receive commands, so as to receive the first command from the host system 1000.

In step S1604, the memory control circuit unit 104 (or the memory management circuit 202) determines whether there is any new command. Specifically, in step S1602, if the memory control circuit unit 104 (or the memory management circuit 202) receives the first command, it indicates that there is a new command, and step S1608 is performed after the step S1604 is performed. By contrast, in step S1602, if there is no new command, the memory control circuit unit 104 (or the memory management circuit 202) determines whether there is any command which is not completely executed in step S1606. For instance, the memory control circuit unit 104 (or the memory management circuit 202) may directly determine whether there is any command that is not executed or not completely executed in the command index register 408. If yes, the memory control circuit unit 104 (or the memory management circuit 202) determines there is a command that is not completely executed. Alternatively, the memory control circuit unit 104 (or the memory management circuit 202) may determine whether the outstanding command index and the end index in the command index register 408 point to the same command index register block. If yes, the memory control circuit unit 104 (or the memory management circuit 202) determines there is no command that is not completely executed, and hence the step S1604 is repeated. By contrast, if the outstanding command index and the end index in the command index register 408 do not point to the same command index register block, the memory control circuit unit 104 (or the memory management circuit 202) determines there is a command that is not completely executed, and step S1608 is then performed.

In step S1608, the memory control circuit unit 104 (or the memory management circuit 202) stops receiving the command. For instance, the memory control circuit unit 104 (or the memory management circuit 202) may switch the switch indication bit in the command receiving switch indicator 414 to be in the status of being unable to receive any command, so as to stop receiving the command from the host system 1000. The memory control circuit unit 104 (or the memory management circuit 202) may then determine whether the status indication bit in the command receiving status indicator 416 is in the status of being receiving a command. If not, step S1610 is then performed because no command is being received. By contrast, if the status indication bit in the command receiving status indicator 416 is in the status of being receiving a command, the memory control circuit unit 104 (or the memory management circuit 202) continues to perform the step S1610 only after the command receiving status indicator 416 is switched to the status of being not receiving any command.

In step S1610, the memory control circuit unit 104 (or the memory management circuit 202) determines whether there is any new command. Since the step S1610 is similar to the step S1604, no further description is provided hereinafter. If there is no new command, step S1620 is performed after the step S1610. By contrast, if there is any new command (e.g., the first command), in step S1612, the memory control circuit unit 104 (or the memory management circuit 202) generates a plurality of updated second indication bits according to the updated first indication bits in the first indicator 404 and a plurality of second indication bits in the second indicator 406 and stores the updated second indication bits in the second indicator 406.

In step S1614, the memory control circuit unit 104 (or the memory management circuit 202) obtains the number of the first command and the first command index of the command indices according to the updated second indication bits. Here, the first command index corresponds to the command transient unit storing the first command in the command queue register 402.

In step S1616, the memory control circuit unit 104 (or the memory management circuit 202) adds the first command index into the command index register 408 and updates the end index in the command index register 408 according to the number of the first command.

In step S1618, the memory control circuit unit 104 (or the memory management circuit 202) rearranges an execution order of a plurality of un-executed command indices stored in the command index register 408 according to the outstanding command index and the end index in the command index register 408.

In step S1620, the memory control circuit unit 104 (or the memory management circuit 202) determines whether there is any command that is completely executed. Particularly, the memory control circuit unit 104 (or the memory management circuit 202) determines whether there is any command that is completely executed in the command index register 402 and may then be erased or may be rewritten by a new command. If there is a command that is completely executed in the command index register 402 and may then be erased or may be rewritten by a new command, step S1622 is performed after the step S1620. By contrast, if there is no command that is completely executed in the command index register 402 and may then be erased or may be rewritten by a new command, step S1624 is performed after the step S1620.

In step S1622, the memory control circuit unit 104 (or the memory management circuit 202) updates the start index in the command index register 408, the first indication bits in the first indicator 404, and the second indication bits in the second indicator 406 according to the command index corresponding to the command that is completely executed in the command index register 402 and may then be erased or may be rewritten by a new command.

After the start index in the command index register 408, the first indication bits in the first indicator 404, and the second indication bits in the second indicator 406 are updated, the memory control circuit unit 104 (or the memory management circuit 202) in step S1624 starts to receive a command. Since the step S1624 is similar to the step S1602, no further description is provided hereinafter.

In step S1626, the memory control circuit unit 104 (or the memory management circuit 202) determines whether there is any to-be-executed command. To be specific, the memory control circuit unit 104 (or the memory management circuit 202) may directly determine whether there is any command index that is not read yet (i.e., the un-executed command index) in the command index register 408. If yes, the memory control circuit unit 104 (or the memory management circuit 202) determines there is a to-be-executed command. Alternatively, the memory control circuit unit 104 (or the memory management circuit 202) may determine whether the outstanding command index and the end index in the command index register 408 point to the same command index register block. If yes, the memory control circuit unit 104 (or the memory management circuit 202) repeats the step S1604 because there is no to-be-executed command. By contrast, if the outstanding command index and the end index in the command index register 408 do not point to the same command index register block, the memory control circuit unit 104 (or the memory management circuit 202) continues to perform step S1628 because there is a to-be-executed command.

In step S1628, the memory control circuit unit 104 (or the memory management circuit 202) executes the command corresponding to the un-executed command index recorded in the command index register 408, and the command is stored in the corresponding command transient unit of the command queue register 402. Besides, as long as the memory control circuit unit 104 (or the memory management circuit 202) is about to execute the next command, the memory control circuit unit 104 (or the memory management circuit 202) updates the outstanding command index (e.g., by adding "1" to the outstanding command index).

Each step shown in FIG. 15 and FIG. 16 is elaborated above and will no longer be described hereinafter. Note that the steps provided in FIG. 15 and FIG. 16 may be implemented in form of programming codes or circuits, which should not be construed as a limitation to the invention. In addition, the methods provided in FIG. 15 and FIG. 16 may be applied with reference to the previous embodiments or may be individually applied, which should not be construed as a limitation to the present invention.

To sum up, according to the method for managing commands in the command queue, the memory controlling using the same, and the memory storage apparatus using the same described herein, the received command queue and the command indices configured for reading the commands in the command queue may be stored, and the command indices corresponding to the un-executed commands may be sequentially arranged in a specific order. Thereby, the command index corresponding to the command with the highest priority may be read first, and the command with the highest priority may be executed. The other command indices are then sequentially read according the specific order, and the other commands are executed.

Moreover, according to the method for managing commands in the command queue, the memory controlling using the same, and the memory storage apparatus using the same described herein, a switch operation may be executed in the ring-shaped command index register by means of the start index, the outstanding command index, and the end index, so as to improve the management efficiency of the command indices.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for managing a plurality of commands received from a host system, the method comprising:
   configuring a command queue register, a first indicator, and a second indicator, wherein the command queue register comprises a plurality of command transient units, and each of the command transient units has a command index pointing to a command storage address;
   configuring a command index register, wherein the command index register comprises a start index, an end index, and an outstanding command index;
   receiving at least one first command from the host system;
   storing the at least one first command in the command queue register according to a plurality of first indication bits in the first indicator and updating the first indication bits according to a current storage status of the command queue register to generate a plurality of updated first indication bits;
   generating a plurality of updated second indication bits according to the updated first indication bits in the first indicator and a plurality of second indication bits in the second indicator;
   obtaining the number of the at least one first command and at least one first command index among the command indices according to the updated second indication bits, wherein the at least one first command index corresponding to at least one command transient unit storing the at least one first command in the command queue register;
   adding the at least one first command index into the command index register and updating the end index according to the number of the at least one first command; and
   executing the commands corresponding to a plurality of un-executed command indices recorded in the command index register, wherein the commands are stored in corresponding command transient units among the command transient units of the command queue register.

2. The method as recited in claim 1, wherein the step of generating the updated second indication bits according to the updated first indication bits in the first indicator and the second indication bits in the second indicator comprises:
   configuring a command receiving switch indicator and a command receiving status indicator;
   stop receiving the at least one first command and switching a switch indication bit in the command receiving switch indicator to be in a status of being unable to receive commands;
   determining whether a status indication bit in the command receiving status indicator is in a status of being receiving commands; and
   if the status indication bit in the command receiving status indicator is not in the status of being receiving commands, generating the updated second indication bits according to the updated first indication bits in the first indicator and the second indication bits in the second indicator.

3. The method as recited in claim 1, wherein the step of generating the updated second indication bits according to the updated first indication bits in the first indicator and the second indication bits in the second indicator comprises:
   executing an XOR operation on the updated first indication bits in the first indicator and the second indication bits in the second indicator; and
   generating the updated second indication bits according to a result of the XOR operation and writing the updated second indication bits into the second indicator.

4. The method as recited in claim 3, wherein the step of generating the updated second indication bits according to the result of the XOR operation and writing the updated second indication bits into the second indicator comprises:
   replacing the updated second indication bits in the second indicator with the updated first indication bits in the first indicator as a plurality of replaced second indication bits.

5. The method as recited in claim 4, further comprising:
   if at least one command which is in the command queue register and corresponds to at least one first un-executed command index among the un-executed command indices is completely executed and ready to be erased, updating the start index, the updated first indication bits in the first indicator, and the replaced second indication bits in the second indicator according to the at least one first un-executed command index.

6. The method as recited in claim 1, wherein the step of obtaining the number of the at least one first command and the at least one first command index corresponding to the at least one command transient unit storing the at least one first command in the command queue register according to the updated second indication bits comprises:
   configuring a new command number recorder and a new command index recorder;
   calculating the number of updated second indication bits being in a first bit status among the updated second indication bits to obtain the number of the at least one first command and recording the number of the at least one first command in the new command number recorder; and
   obtaining the at least one first command index corresponding to the at least one command transient unit storing the at least one first command in the command queue register according to the updated second indication bits being in the first bit status and recording the at least one first command index in the new command index recorder.

7. The method as recited in claim 1, wherein the step of executing the commands which are stored in the corresponding command transient units among the command transient units of the command queue register and corresponding to the un-executed command indices recorded in the command index register comprises:
   rearranging an execution order of the un-executed command indices recorded in the command index register according to the outstanding command index and the end index; and executing the commands in the execution order, wherein the commands are stored in the corresponding command transient units among the command transient units of the command queue register and corresponding to the un-executed command indices recorded in the command index register.

8. The method as recited in claim 7, wherein the step of rearranging the execution order of the un-executed command indices recorded in the command index register according to the outstanding command index and the end index comprises:
   obtaining the un-executed command indices recorded in the command index register according to the outstanding command index and the end index,
   wherein the un-executed command indices comprise the at least one first command index and at least one second command index corresponding to at least one second command stored in the command queue register.

9. A memory control circuit unit comprising:
   a host interface configured to couple to a host system; and
   a memory management circuit coupled to the host system,
   wherein the memory management circuit is configured to configure a command queue register, a first indicator, and a second indicator, the command queue register comprises a plurality of command transient units, and each of the command transient units has a command index pointing to a command storage address,
   wherein the memory management circuit is further configured to configure a command index register, and the command index register comprises a start index, an end index, and an outstanding command index,
   wherein the memory management circuit is further configured to receive at least one first command from the host system,
   wherein the memory management circuit is further configured to store the at least one first command in the command queue register according to a plurality of first indication bits in the first indicator and update the first indication bits according to a current storage status of the command queue register to generate a plurality of updated first indication bits,
   wherein the memory management circuit is further configured to generate a plurality of updated second indication bits according to the updated first indication bits in the first indicator and a plurality of second indication bits in the second indicator,
   wherein the memory management circuit is further configured to obtain the number of the at least one first command and at least one first command index of the command indices according to the updated second indication bits, and the at least one first command index corresponds to at least one command transient unit storing the at least one first command in the command queue register,
   wherein the memory management circuit is further configured to add the at least one first command index into the command index register and update the end index according to the number of the at least one first command,
   wherein the memory management circuit is further configured to execute the commands corresponding to a plurality of un-executed command indices recorded in the command index register, and the commands are stored in the corresponding command transient units among the command transient units of the command queue register.

10. The memory control circuit unit as recited in claim 9, wherein the memory management circuit is further configured to configure a command receiving switch indicator and a command receiving status indicator,
   wherein the memory management circuit is further configured to stop receiving the at least one first command and switching a switch indication bit in the command receiving switch indicator to be in a status of being unable to receive commands,
   wherein the memory management circuit is further configured to determine whether a status indication bit in the command receiving status indicator is in a status of being receiving commands, and
   wherein if the status indication bit in the command receiving status indicator is not in the status of being receiving commands, the memory management circuit is further configured to generate the updated second indication bits according to the updated first indication bits in the first indicator and the second indication bits in the second indicator.

11. The memory control circuit unit as recited in claim 9, wherein the memory management circuit is further configured to execute an XOR operation on the updated first indication bits in the first indicator and the second indication bits in the second indicator,
   wherein the memory management circuit is further configured to generate the updated second indication bits according to a result of the XOR operation and write the updated second indication bits into the second indicator.

12. The memory control circuit unit as recited in claim 11, wherein the memory management circuit is further configured to replace the updated second indication bits in the second indicator with the updated first indication bits in the first indicator as a plurality of replaced second indication bits.

13. The memory control circuit unit as recited in claim 12, wherein if at least one command which is in the command queue register and corresponds to at least one first un-executed command index among the un-executed command indices is completely executed and ready to be erased, the memory management circuit is further configured to update the start index, the updated first indication bits in the first indicator, and the replaced second indication bits in the second indicator according to the at least one first un-executed command index.

14. The memory control circuit unit as recited in claim 9, wherein the memory management circuit is further configured to configure a new command number recorder and a new command index recorder,
   wherein the memory management circuit is further configured to calculate the number of updated second indication bits being in a first bit status among the updated second indication bits to obtain the number of the at least one first command and recording the number of the at least one first command in the new command number recorder,
   wherein the memory management circuit is further configured to obtain the at least one first command index corresponding to the at least one command transient unit storing the at least one first command in the command queue register according to the updated second indication bits being in the first bit status and recording the at least one first command index in the new command index recorder.

15. The memory control circuit unit as recited in claim 9, wherein the memory management circuit is further configured to rearrange an execution order of the un-executed command indices recorded in the command index register according to the outstanding command index and the end index, wherein the memory management circuit is further configured to execute in the execution order the commands which are stored in the corresponding command transient units among the command transient units of the command queue register and correspond to the un-executed command indices recorded in the command index register.

16. The memory control circuit unit as recited in claim 15, wherein the memory management circuit is further configured to obtain the un-executed command indices recorded in the command index register according to the outstanding command index and the end index,
wherein the un-executed command indices comprise the at least one first command index and at least one second command index corresponding to at least one second command stored in the command queue register.

17. A memory storage apparatus comprising:
a connect interface unit configured to couple to a host system;
a rewritable non-volatile memory module configured to store data;
a memory control circuit unit coupled to the connect interface unit and the rewritable non-volatile memory module,
wherein the memory control circuit unit is configured to configure a command queue register, a first indicator, and a second indicator, the command queue register comprises a plurality of command transient units, and each of the command transient units has a command index pointing to a command storage address,
wherein the memory control circuit unit is further configured to configure a command index register, and the command index register comprises a start index, an end index, and an outstanding command index,
wherein the memory control circuit unit is further configured to receive at least one first command from the host system,
wherein the memory control circuit unit is further configured to store the at least one first command in the command queue register according to a plurality of first indication bits in the first indicator and update the first indication bits according to a current storage status of the command queue register to generate a plurality of updated first indication bits,
wherein the memory control circuit unit is further configured to generate a plurality of updated second indication bits according to the updated first indication bits in the first indicator and a plurality of second indication bits in the second indicator,
wherein the memory control circuit unit is further configured to obtain the number of the at least one first command and at least one first command index of the command indices according to the updated second indication bits, and the at least one first command index corresponds to at least one command transient unit storing the at least one first command in the command queue register,
wherein the memory control circuit unit is further configured to add the at least one first command index into the command index register and update the end index according to the number of the at least one first command,
wherein the memory control circuit unit is further configured to execute the commands corresponding to a plurality of un-executed command indices recorded in the command index register, and the commands are stored in the corresponding command transient units among the command transient units of the command queue register.

18. The memory storage apparatus as recited in claim 17, wherein the memory control circuit unit is further configured to configure a command receiving switch indicator and a command receiving status indicator,
wherein the memory control circuit unit is further configured to stop receiving the at least one first command and switching a switch indication bit in the command receiving switch indicator to be in a status of being unable to receive commands,
wherein the memory control circuit unit is further configured to determine whether a status indication bit in the command receiving status indicator is in a status of being receiving commands,
wherein if the status indication bit in the command receiving status indicator is not in the status of being receiving commands, the memory control circuit unit is further configured to generate the updated second indication bits according to the updated first indication bits in the first indicator and the second indication bits in the second indicator.

19. The memory storage apparatus as recited in claim 17, wherein the memory control circuit unit is further configured to execute an XOR operation on the updated first indication bits in the first indicator and the second indication bits in the second indicator,
wherein the memory control circuit unit is further configured to generate the updated second indication bits according to a result of the XOR operation and write the updated second indication bits into the second indicator.

20. The memory storage apparatus as recited in claim 19, wherein the memory control circuit unit is further configured to replace the updated second indication bits in the second indicator with the updated first indication bits in the first indicator as a plurality of replaced second indication bits.

21. The memory storage apparatus as recited in claim 20, wherein if at least one command which is in the command queue register and corresponds to at least one first un-executed command index among the un-executed command indices is completely executed and ready to be erased, the memory control circuit unit is further configured to update the start index, the updated first indication bits in the first indicator, and the replaced second indication bits in the second indicator according to the at least one first un-executed command index.

22. The memory storage apparatus as recited in claim 17, wherein the memory control circuit unit is further configured to configure a new command number recorder and a new command index recorder,
wherein the memory control circuit unit is further configured to calculate the number of updated second indication bits being in a first bit status to obtain the among of the at least one first command and recording the number of the at least one first command in the new command number recorder,
wherein the memory control circuit unit is further configured to obtain the at least one first command index corresponding to the at least one command transient unit storing the at least one first command in the command queue register according to the updated second indication bits being in the first bit status and recording the at least one first command index in the new command index recorder.

23. The memory storage apparatus as recited in claim 17, wherein the memory control circuit unit is further configured to rearrange an execution order of the un-executed command indices recorded in the command index register according to the outstanding command index and the end index, wherein the memory control circuit unit is further configured to execute in the execution order the commands which are stored in the corresponding command transient units among the command transient units of the command queue register and correspond to the un-executed command indices recorded in the command index register.

24. The memory storage apparatus as recited in claim 23, wherein the memory control circuit unit is further configured to obtain the un-executed command indices recorded in the command index register according to the outstanding command index and the end index, wherein the un-executed command indices comprise the at least one first command index and at least one second command index corresponding to at least one second command stored in the command queue register.

* * * * *